United States Patent [19]

Grove

[11] Patent Number: 5,582,545

[45] Date of Patent: Dec. 10, 1996

[54] STRAW WALKER APPARATUS

[76] Inventor: Ivan Grove, 385 Bender Rd., Hanover, Pa. 17331

[21] Appl. No.: 466,178

[22] Filed: Jun. 6, 1995

[51] Int. Cl.[6] ................................................. A01F 12/32
[52] U.S. Cl. ............................................. 460/85; 460/96
[58] Field of Search .............................. 460/85, 86, 90, 460/91, 96, 901

[56] References Cited

U.S. PATENT DOCUMENTS

| | | |
|---|---|---|
| 3,420,238 | 1/1969 | Bulin . |
| 3,435,953 | 4/1969 | Schlue, Jr. .............................. 460/85 X |
| 3,580,258 | 5/1971 | Stroburg ................................. 460/85 X |
| 3,599,644 | 8/1971 | Bichel et al. . |
| 3,603,063 | 9/1971 | Stroburg ................................. 460/85 X |
| 4,392,500 | 7/1983 | Houle . |
| 4,805,640 | 2/1989 | Bennett . |
| 5,021,029 | 6/1991 | Usick ...................................... 460/85 |
| 5,256,106 | 10/1993 | Shrawder ................................. 460/39 |

FOREIGN PATENT DOCUMENTS

| | | | |
|---|---|---|---|
| 1311659 | 5/1987 | U.S.S.R. ................................. 460/85 |

*Primary Examiner*—Terry Lee Melius
*Attorney, Agent, or Firm*—Henderson & Sturm

[57] ABSTRACT

An improvement to the grid racks (100) in the straw walker portion of a grain combine; wherein, the grid racks (100) are provided with a plurality of apertured steps (101)(102)(103), etc. and raised side walls (108)(109); and, the improvement comprises a plurality of auxiliary saw toothed units (12) and (13) mounted on the apertured steps (101)(102)(103), etc. of the grid racks (100) and a saw tooth panel unit (17) mounted on the sides (108)(109) of the grid rack (100) to aggressively process stalks or straw passing through the straw walker portion of the combine.

13 Claims, 7 Drawing Sheets

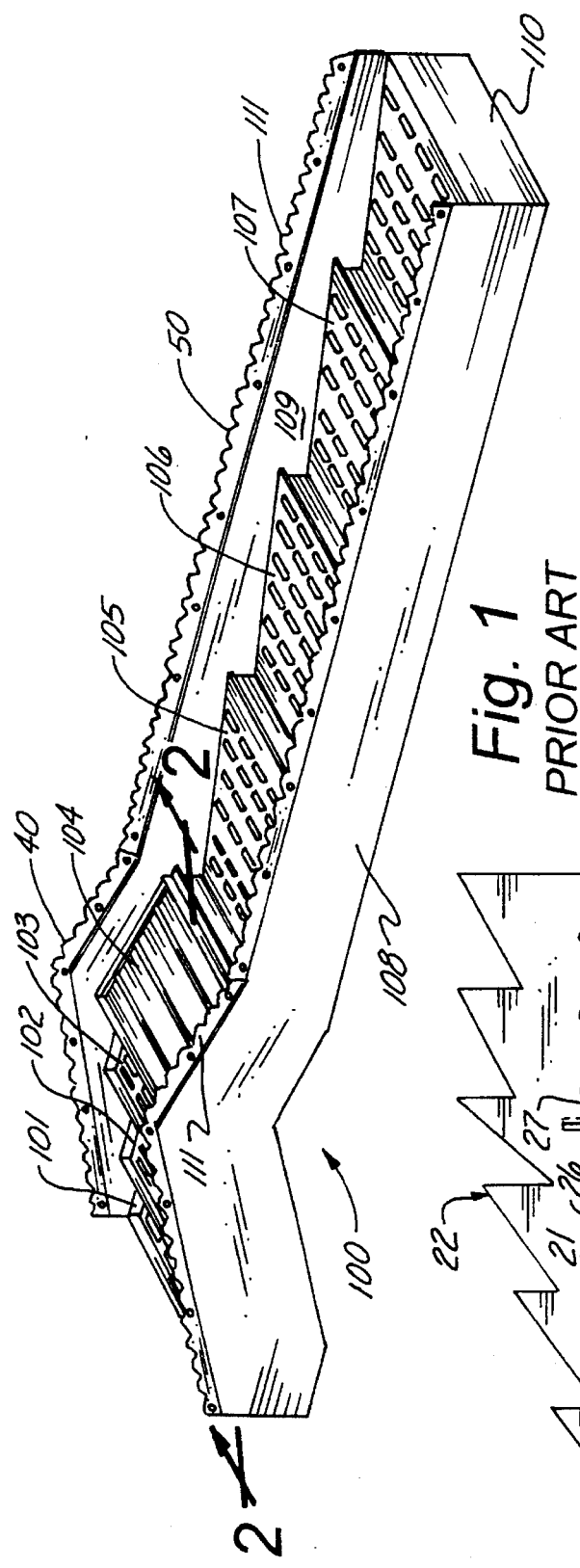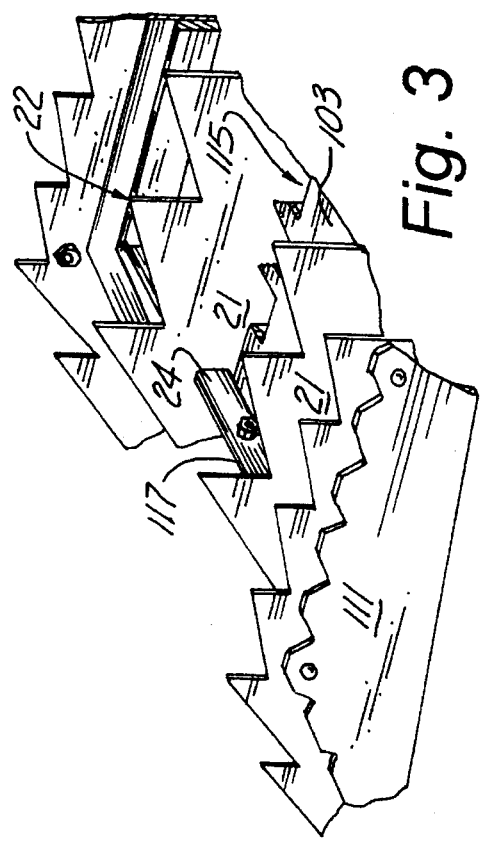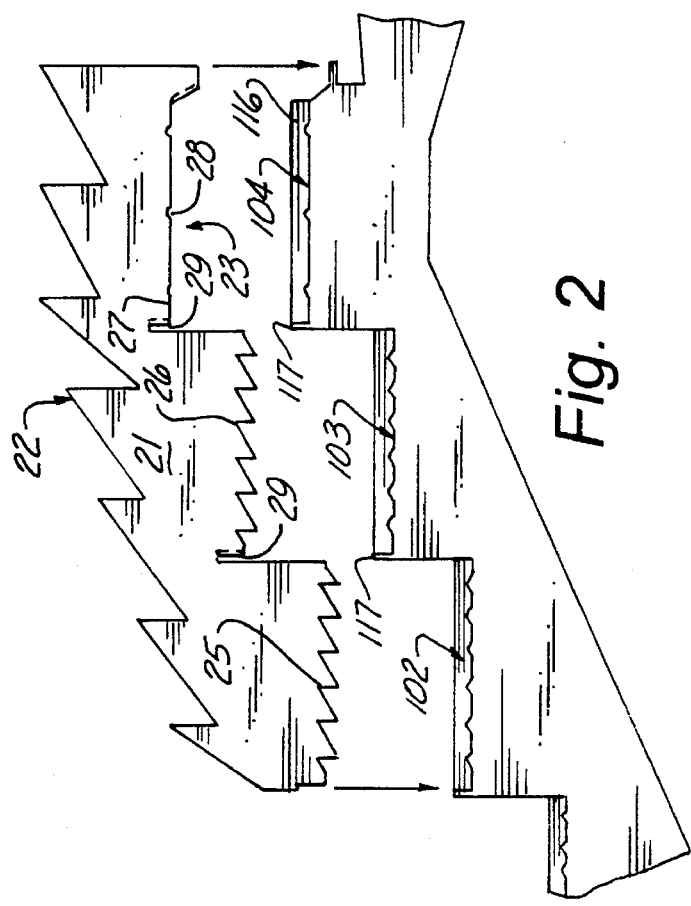
Fig. 1 PRIOR ART
Fig. 2
Fig. 3

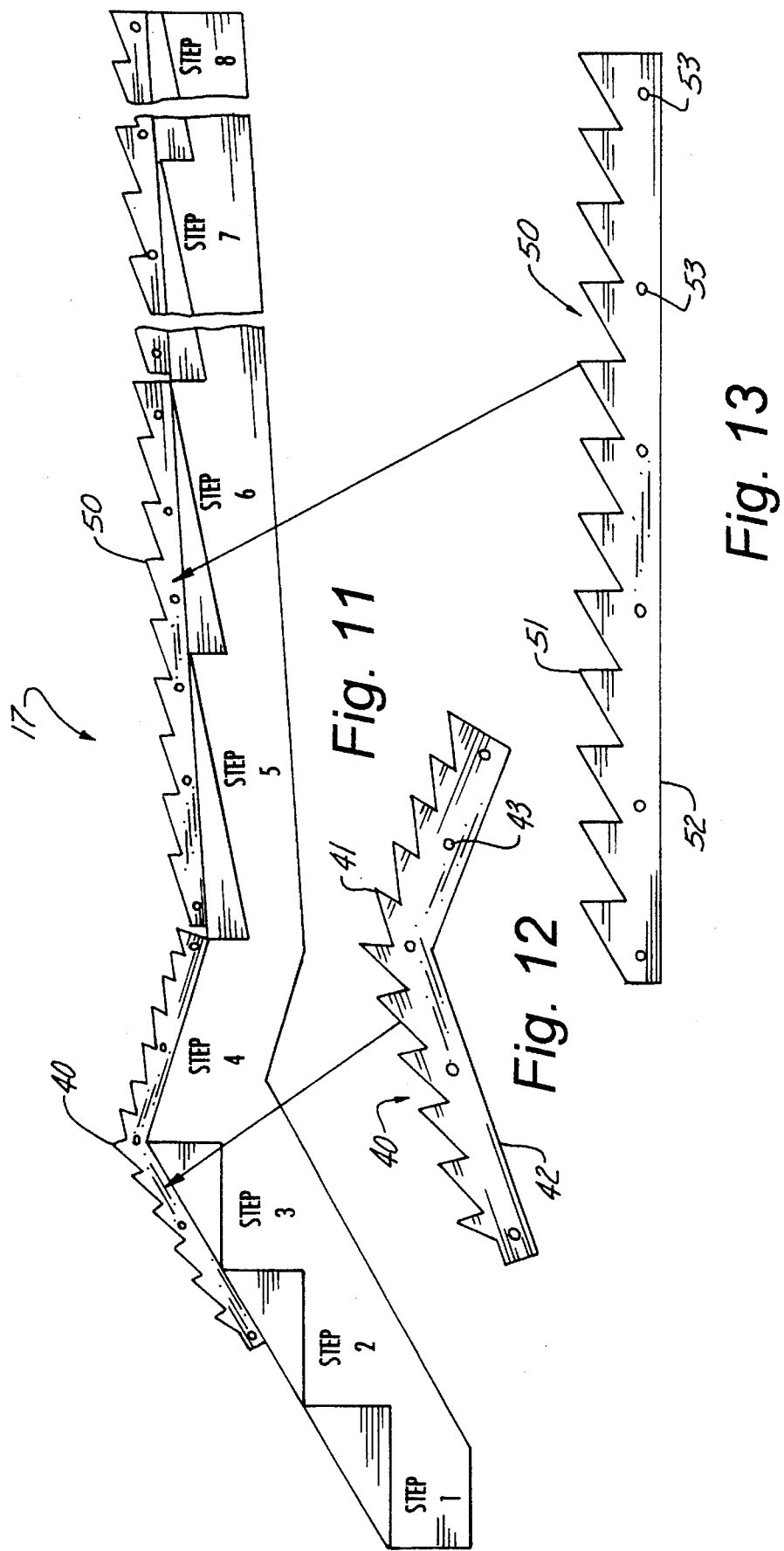

STRAW WALKER APPARATUS

TECHNICAL FIELD

The present invention relates to the field of grain combines in general, and in particular to an improvement to a straw walker apparatus which aggressively processes the harvested material to increase the efficiency of the straw walker portion of the combine.

BACKGROUND ART

As can be seen by reference to the following U.S. Pat. Nos. 3,420,238; 3,599,644; 4,392,500; and 4,805,640; the prior art is replete with myriad and diverse straw walker mechanisms for combines.

While all of the aforementioned prior art constructions are more than adequate for the basic purpose and function for which they have been specifically designed, these patented devices are uniformly deficient in their throughput and efficiency relative to the volume of the crop that can be processed in a given time relative to the yield that is produced thereby.

As is the case with virtually all straw walker arrangements, the straw walker comprises in general oscillating straw rack grids that are positioned downstream of the rotating cylinder of the threshing portion of the combine; wherein, the straw walker further separates the grain from the straw or stalk material.

In most conventional arrangements the straw walker comprises a series of grids or sections normally including a front section followed by at least a second, third, fourth, and fifth section. Obviously additional sections can be incorporated into the combine depending on the length of the straw walker portion of the combine.

Unfortunately, to date the accepted thinking has been that the straw walker section should only contain saw tooth segments formed integrally with the longitudinal sides of the individual sections; wherein, the stem lengths of straw or stalks are unsupported along the width of the individual sections.

Not only does this arrangement lead to an accumulation of debris, that tends to clog the apertures in the straw grid sections resulting in periodic shut downs of the combine to clear the apertures; but it also tends to increase the total number of individual sections required to effectively separate the grain from the stalks or straw resulting in longer and more expensive straw walker portions.

As a consequence of the foregoing situation, there has existed a longstanding need for an improved straw walker apparatus that provides an aggressive approach to the separating function of the straw walker via the incorporation of additional saw toothed segments onto the individual straw walker sections; and, the provision of such a construction is a stated objective of the present invention.

DISCLOSURE OF THE INVENTION

Briefly stated, the improvement to a straw walker apparatus that forms the basis of the present invention comprises a plurality of saw toothed units that are inserted into the straw walker portion of a combine; wherein, the saw toothed units are configured to be received by the individual straw walker sections to provide a more aggressive and efficient separation of the grain from the straw or stalks.

As will be explained in greater detail further on in the specification, there are two versions of the saw toothed units that comprise the invention wherein each version employs specially contoured stages that conform to one or more of the grid sections. In addition each of the saw toothed units have rows of saw tooth elements that are disposed in parallel to one another and generally equally spaced from one another and the raised saw toothed sides of the conventional straw walker.

The placement of the rows of saw toothed elements relative to the individual grid sections not only provides lateral support to the stems of the straw or stalks, but also promotes the parallel bunching of the stems as they are agitated and transported through the straw walker portion of the combine. This not only increases the separating efficiency of the modified straw walker, but, also minimizes the possibility that the grid apertures will become clogged with debris.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of a conventional prior art straw walker construction depicting the individual grid section and associated raised saw toothed side panels.

FIG. 2 is an exploded side view of the first stage of the preferred embodiment of the invention and the front bed of a conventional straw walker.

FIG. 3 is a rear perspective view of the arrangement depicted in FIG. 2.

FIG. 11 is a side view of the saw toothed panels that are employed with the saw toothed sides of a conventional straw walker;

FIG. 12 is an isolated side view of the first panel segment;

FIG. 13 is an isolated side view of the second panel segment;

BEST MODE FOR CARRYING OUT THE INVENTION

Prior to embarking on a detailed description of the subject matter of this invention, it would first be advisable to isolate and explain in detail the basic structural environment in which this invention will be deployed.

Figure 7:
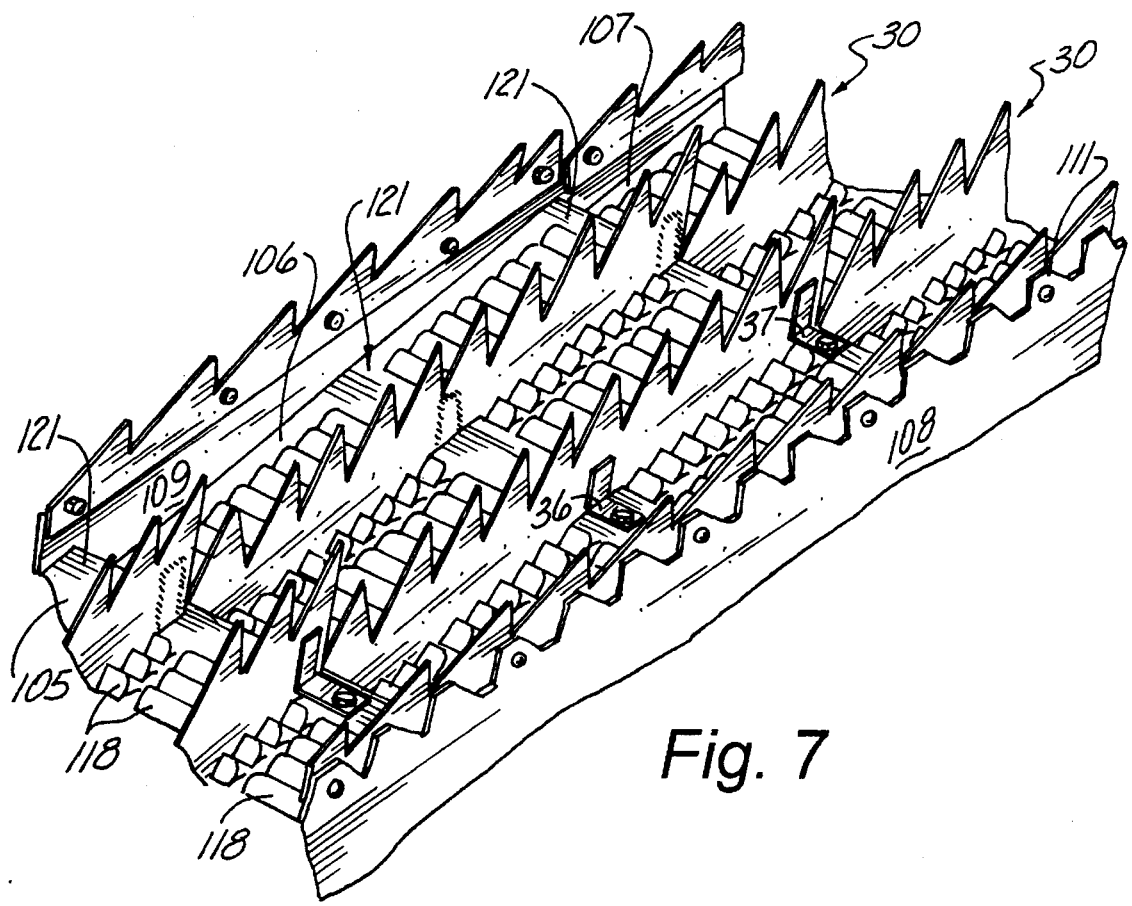
FIG. 7 is a front perspective view of the second stage of the preferred embodiment mounted on the straw walker.
Figure 8:
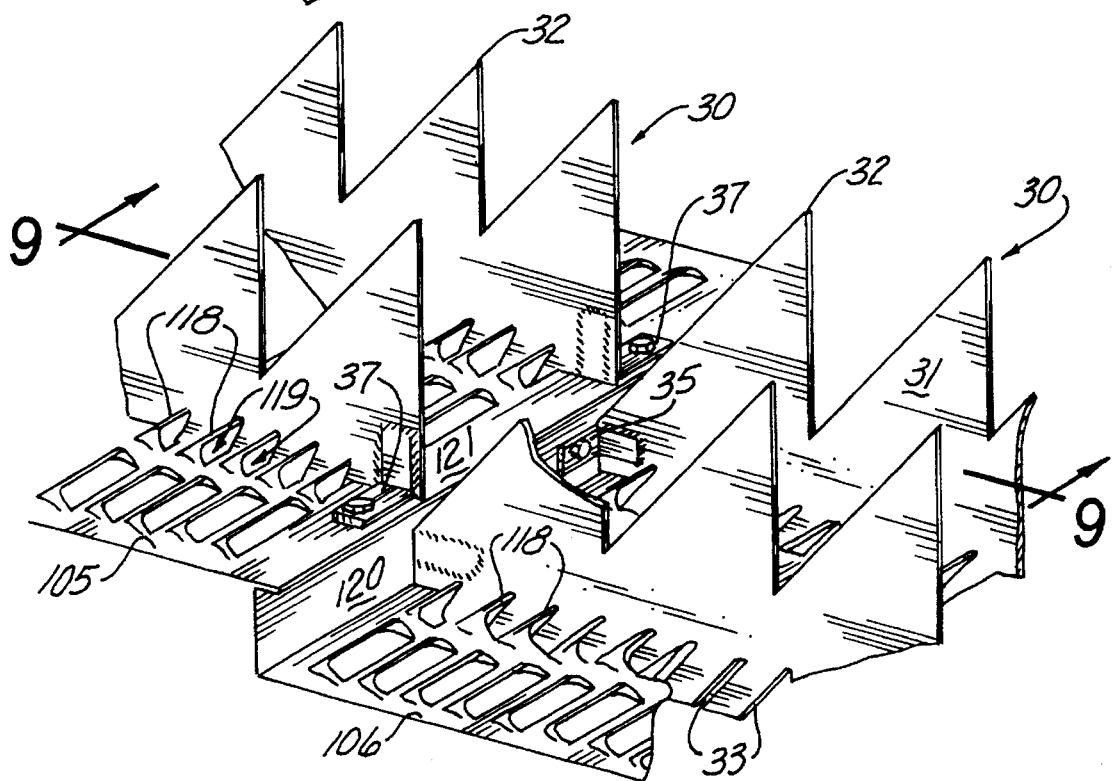
FIG. 8 is a rear perspective view of the second stage of the preferred embodiment.
Figure 9:
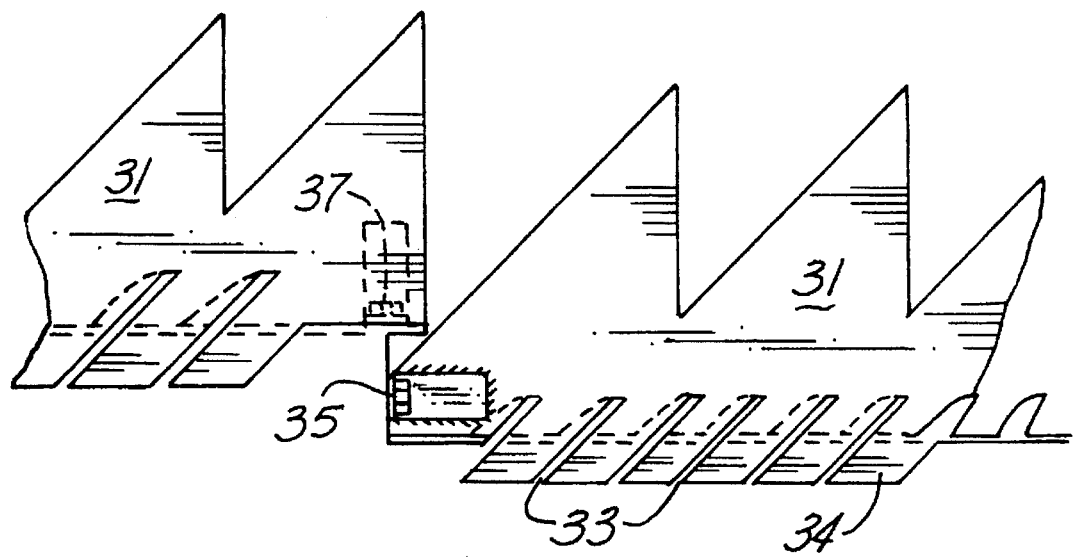
FIG. 9 is a cross-sectional view taken through line 9—9 of FIG. 8.
Figure 10:
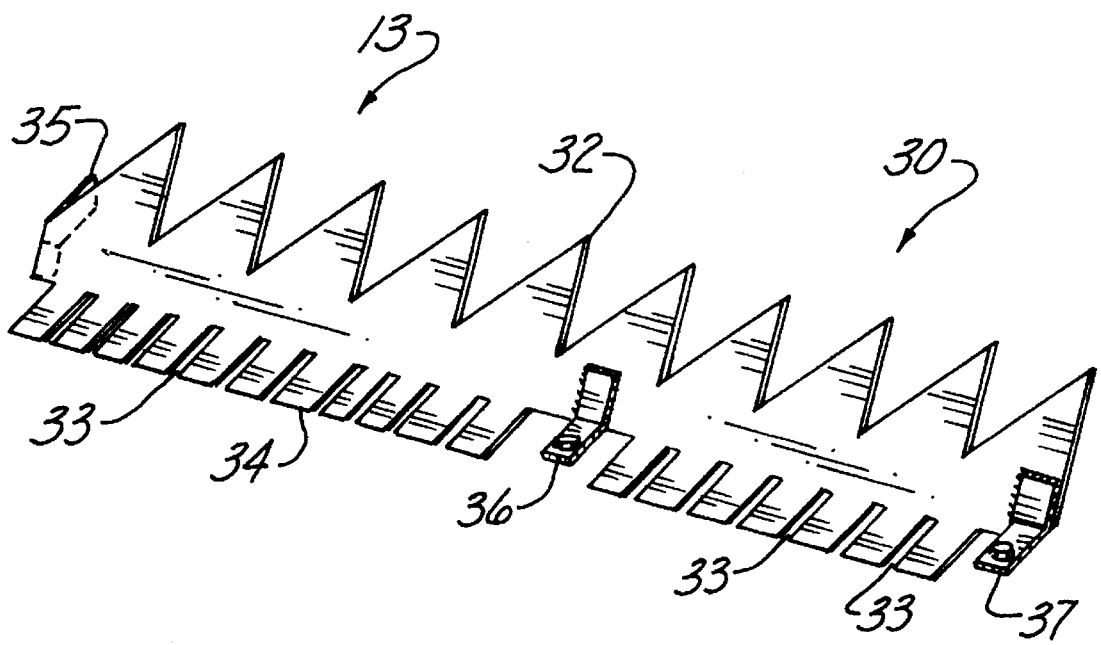
FIG. 10 is a perspective view of one side of the second stage of the preferred embodiment.

As shown in FIGS. 1 and 7, a typical straw walker apparatus comprises a plurality of identical straw rack grids (100) which are moveable relative to one another within the straw walker portion of a grain combine (not shown). Each straw rack grid (100) comprises in general a series of steps wherein the first three steps (101) (102) and (103) are apertured, the fourth step (104) is ribbed and the remaining steps (105) (106) (107) etc. are apertured, with the total number of steps being dictated by the length of the straw walker portions of the combine.

As can best be seen by reference to FIG. 1, each of the steps are supported between the raised sidewall (108) (109) of a grid framework (110); wherein, the sidewalls (108) (109) are further provided with a saw toothed configured top portion (111). As was mentioned previously, each of the straw rack grids (100) move independently of one another and the straw or stalks are agitated and moved from front to rear with reference to the drawings in a well recognized manner; whereby, residual grain is further separated from the straw or stalks.

In the preferred embodiment of the invention illustrated in FIGS. 2 through 10 and 17, the improved straw walker apparatus is designated generally as (10) and comprises a plurality of auxiliary saw toothed units (12) (13) and a saw toothed panel unit (17) that are designed and intended to be attached to selected portions of each of the individual straw rack grids (100). The auxiliary saw toothed units of the preferred embodiment comprise a first stage saw toothed unit (12), a second stage saw toothed unit (13) and a saw toothed panel unit (17). These units will now be described in seriatim fashion.

As shown in FIGS. 2 through 6, the first stage saw toothed unit (12) comprises a saw toothed member (20) dimensioned to overlie the second (1022) third (103) and fourth (104) steps of a conventional straw grid rack (100). The saw toothed member (20) comprises a first pair of identical plate elements (21) having an enlarged forwardly angled saw tooth configuration on their upper end (22) and a generally stepped configuration on their lower end (23), wherein the plate elements (21) are joined together in parallel fashion by a plurality of cross-piece elements (24).

Figure 5:
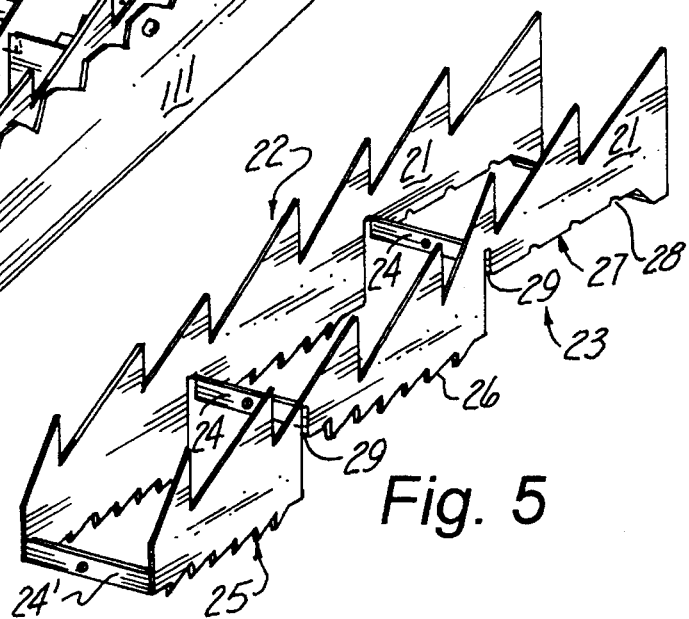
FIG. 5 is an isolated perspective view of the first stage of the preferred embodiment.
Figure 6:
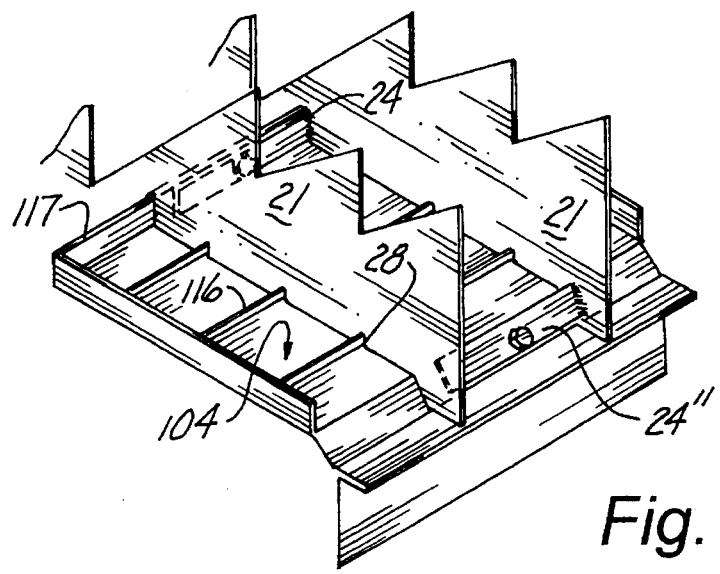
FIG. 6 is an isolated detail view of the engagement of the rear end of the first stage of the preferred embodiment with the straw walker.

As can best be seen by reference to FIGS. 2 and 5, the lower end (23) of the plate elements (21) are provided with first (25) second (26) and third (27) step portions; wherein, the first and second step portions (25) (26) are provided with a rearwardly angled saw tooth configuration, the teeth of which are dimensioned to be received in the apertures (115) of the second (102) and third (103) steps of the grid rack (100); and, wherein the third step portion (27) is provided with spaced recesses (28) which are dimensioned to receive the raised ribs (116) of the fourth step (104) of the grid rack.

Figure 4:
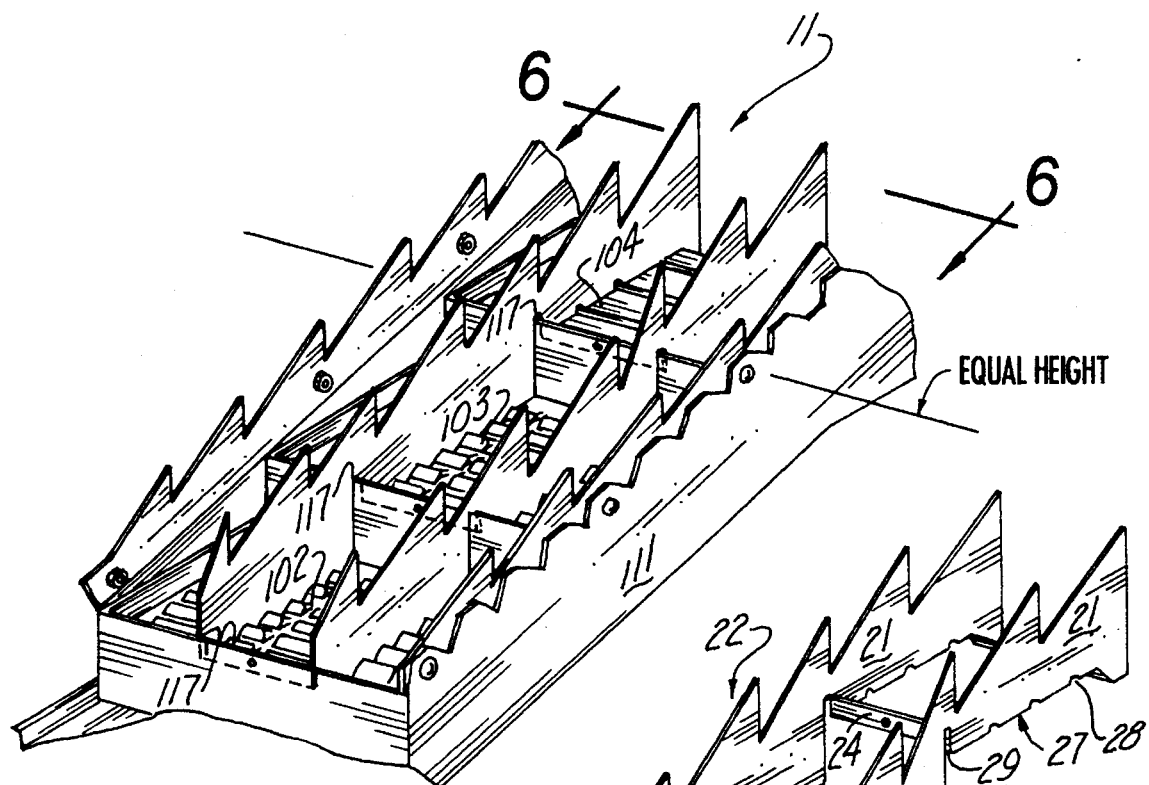
FIG. 4 is a front perspective view of the arrangement of FIG. 2.

As shown in FIGS. 2, 4 and 5, the lower end (23) of the plate elements (21) are further provided with discrete slots (29) which are dimensioned to receive the raised front lips (117) of the third and fourth steps (103) (104); wherein, the cross-piece elements (24) of the plate elements (21) may be secured directly to the conventional structure (100) in a well recognized fashion. Furthermore, the front cross-piece element (24') is secured directly to the front lip (117) of the second step (102), and the rear cross-piece element (24") is disposed on a downwardly depending rear portion of the plate elements (21) and secured directly to the downwardly angled rear end of the fourth step (104).

Turning now to FIGS. 7 through 10, it can be seen that the second stage saw toothed unit (13) comprises individual pairs of generally elongated saw toothed members (30); wherein, each pair of saw toothed members (30) comprises separate mirror image elongated plate elements (31) having an enlarged saw toothed configuration on their upper end (32) and a plurality of rearwardly angled parallel slots (33) formed on their lower end (34); wherein, the angled slots (33) are dimensioned to receive the raised lips (118) that define the aperture openings (119) that are found respectively on the fifth, sixth, and seventh steps (105) (106) (107) of each grid rack (100).

In addition, each of the mirror image plate elements (31) are provided with an inwardly and vertically oriented mounting flange (35) on their leading edge and outwardly and horizontally oriented mounting flanges (36) (37) disposed at their midpoint and rearward end respectively; wherein, the inwardly directed mounting flange (35) is operatively secured to the front edge (120) of the respective steps (105) (106) etc.; and, wherein the outwardly directed mounting flanges (36) (37) are operatively secured to flat lands (121) that extend transversely across the respective steps (105) (106) etc. intermediate series or arrays of apertures (119).

Furthermore, each of the mirror image plate elements (31) have a length equivalent to the length of each of the individual steps (105) (106) etc. and are generally equally spaced both relative to one another and to the sidewalls (108) (109) of the grid racks (100).

As shown in FIGS. 11 through 13, the saw toothed panel unit (17) comprises a pair of angled panel members (40) and one or more pairs of elongated panel members (50). The angled panel members (40) are provided with an enlarged saw toothed configuration on their upper end (41) and a generally flat angled configuration on their lower end (42). Furthermore, the angled panel members (40) are provided with a plurality of spaced apertures (43) and are dimensioned to extend over at least a portion of some of the first four steps (102) (103) (104) of the grid rack (100) wherein the panel members (40) are mounted on the interior surface of the raised saw toothed portions (111) of the sidewalls (108) (109) of the grid rack (100).

Figure 14:
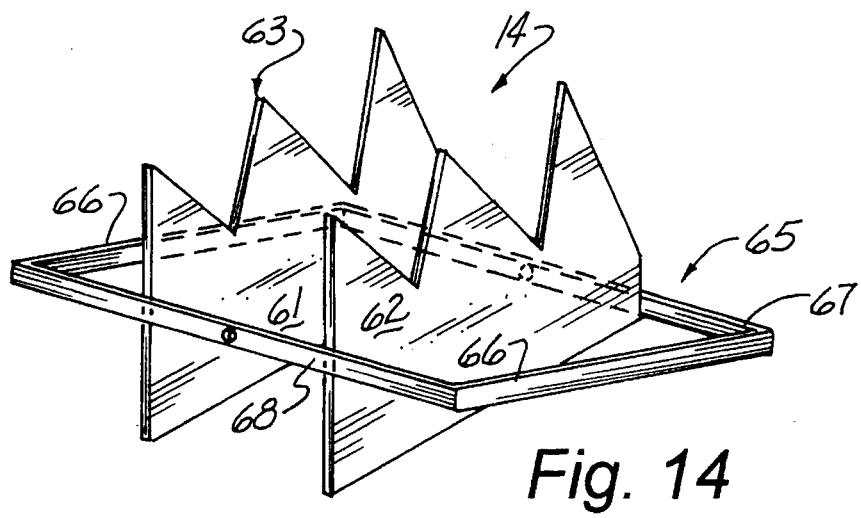
FIG. 14 is an isolated perspective view of the first stage of an alternative version of the preferred embodiment.
Figure 15:
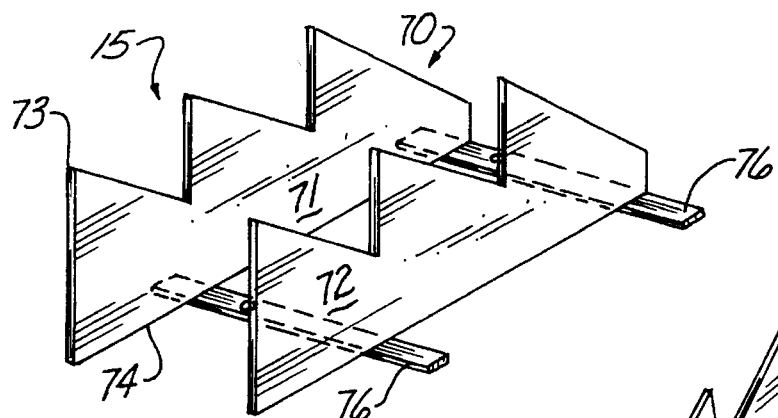
FIG. 15 is an isolated perspective view of an intermediate stage of the alternative version.
Figure 16:
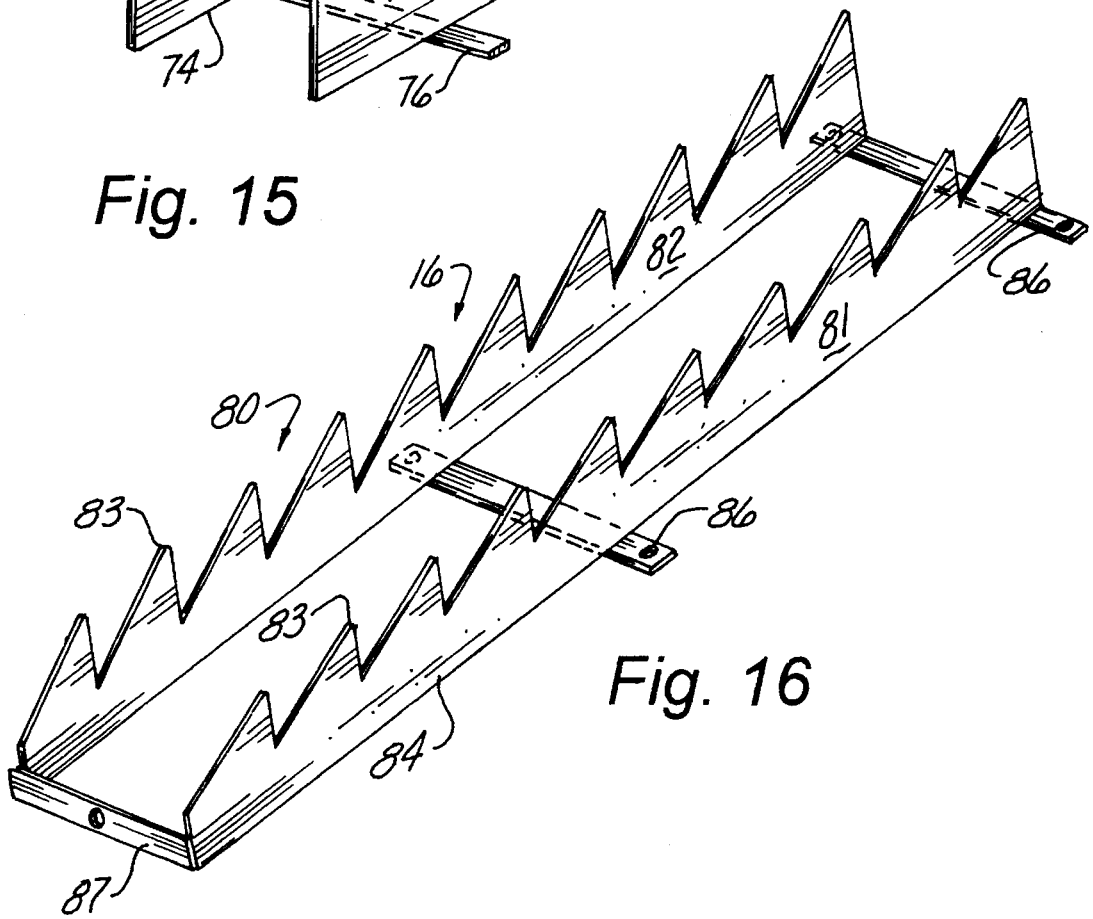
FIG. 16 is an isolated perspective view of the second stage of the alternate version.
Figure 17:
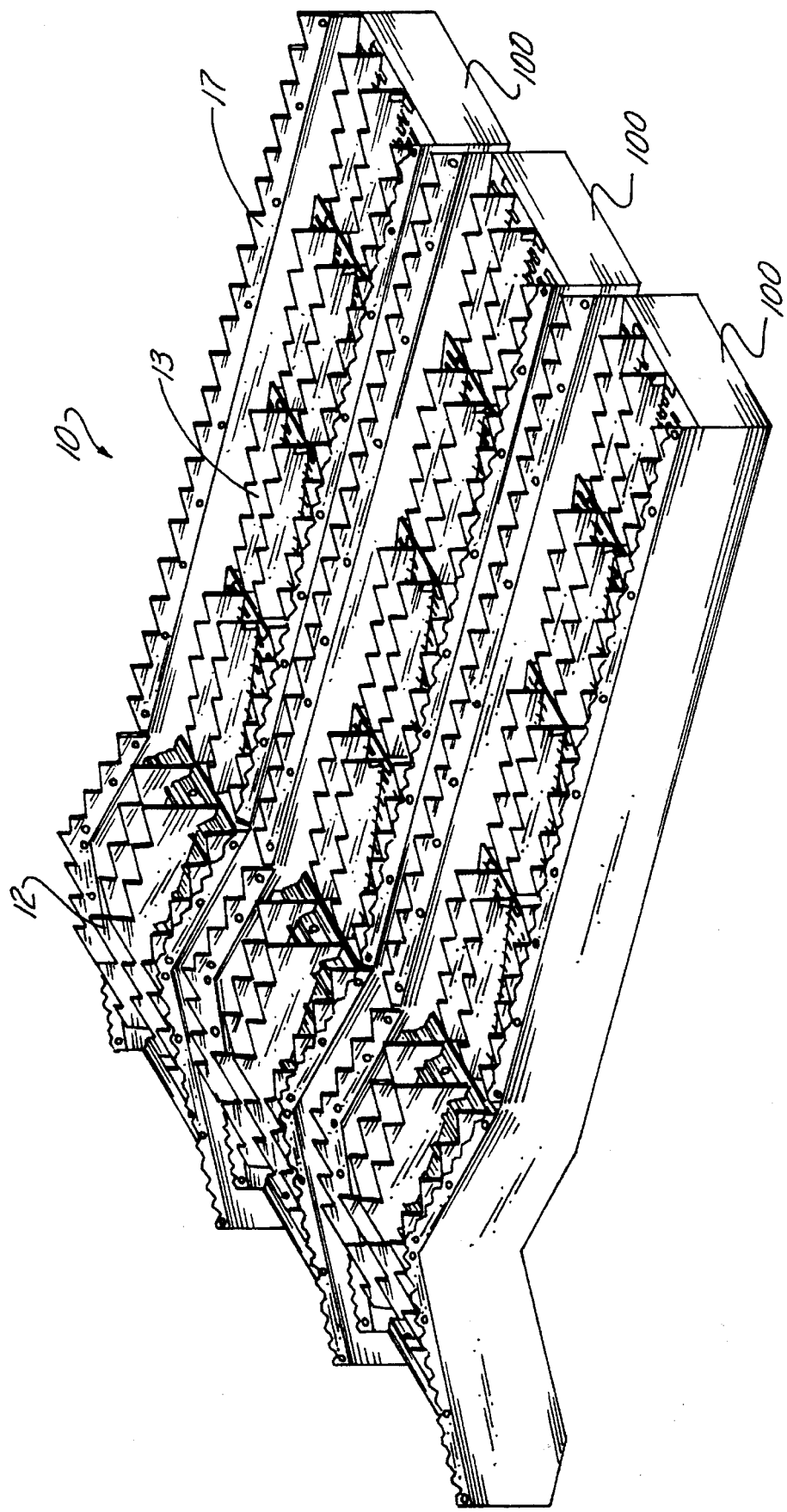
FIG. 17 is a perspective view of the preferred version installed on a conventional straw walker.

In addition, the elongated panel members (50) are likewise provided with an enlarged saw toothed configuration on their upper end (51), a generally flat lower end (52), and a plurality of spaced apertures (53) disposed along their length; wherein, the elongated panel members (50) are dimensioned to extend over at least two of the remaining steps (105) (106) etc. of the grid rack (100), and also be secured to the interior surface of the raised saw toothed portions (111) of the sidewalls of the grid rack In the alternate version of the preferred embodiment illustrated in FIGS. 14 through 16, the improved straw walker apparatus comprises a plurality of auxiliary saw toothed units (14) (15) and (16) plus the previously described auxiliary panel unit (17). In this version, the auxiliary saw toothed units correspond to the individual steps (103) (104) and (105) of the grid rack (100) as will be explained presently.

While the second alternate saw toothed unit (15) comprises a single saw toothed member (70) that is specifically contoured to be received on the aperture free ribbed surface of the fourth step (104) of the grid rack (100), the first alternate saw toothed unit (14) comprises a plurality of relatively short individual saw toothed members (60); wherein, each member (60) is dimensioned to be received on any of the first three steps (101) (102) (103) of the grid rack (100); and, wherein the third alternate saw toothed unit (16) also comprises a plurality of relatively long individual saw toothed members (80) wherein each member (80) is dimensioned to be received on any of the remaining steps (105) (106) etc. of the grid rack (100).

Turning now to FIG. 14, it can be seen that the individual first alternate saw toothed members (60) comprise a pair of saw toothed plate elements (61) (62) having an enlarged saw toothed configuration formed on their upper end (63) and a generally flat lower end (64); wherein, the saw toothed plate elements (61) (62) are disposed in a parallel relationship to one another and suspended within a generally rectangular framework (65) having angled sides (66) and vertically disposed front (67) and rear (68) surfaces; wherein the framework (65) is rigidly secured to the sidewalls (108) (109) and/or the front and rear surfaces (117) of the individual grid steps (101) (102) or (103) of the grid rack (100) in a well recognized fashion.

As can be seen by reference to FIG. 15, the second alternate saw toothed member (70) comprises a pair of saw toothed plate elements (71) (72) having an enlarged saw tooth configuration formed on their upper end (73) and a generally flat lower end (74).

In addition, the lower end (74) of the plate elements (71) (72) are further provided with a pair of generally flat elongated cross-piece elements (76) which extend between and project beyond the sides of the saw toothed plate elements (71) (72); wherein, the cross-piece elements (76) are employed to secure the second alternate saw toothed member (70) to the rib-free portions of the fourth step (104).

Turning now to FIG. 16, it can be seen that the third alternate saw toothed member (80) also comprises an elongated pair of saw toothed plate elements (81) (82) having an enlarged saw tooth configuration formed on their upper end (83) and a generally flat lower end (84) provided with a pair of generally flat elongated cross-piece elements (86) which extend between and project beyond the sides of the elongated saw toothed plate elements (81) (82) and a vertically disposed cross-piece element (87); wherein, the cross-piece elements (86) are employed to secure the third alternate saw toothed member (80) to the flat lands (121) on the remaining steps (105) (106) etc. of the grid rack (100); and the vertical cross-piece element (87) is employed to secure the from of the third alternate saw toothed member (80) to the from lips (117) of the steps (105) (106), etc.

At this juncture, it should be emphasized that the heart of this invention revolves around the addition of one or more vertically disposed saw toothed plates having an enlarged saw toothed configuration formed on their upper end disposed parallel to the longitudinal axis of each one of the sequential steps (101) (102) (103) etc. of the respective grid racks (100).

It should also be noted that in the evolution of this invention the alternative version of the preferred embodiment was developed first and test results clearly indicated that the grain harvesting efficiency of a conventional straw walker was significantly improved by the aggressive agitation of the stalks or straw not only by the insertion of the additional enlarged saw toothed patterned plates along the apertured steps of the grid racks (100), but also by the enlarged and elongated saw toothed panel units (17) on both of the sidewalls (108)(109) of the individual grid racks (100).

While the enlarged saw toothed configuration of both the plates and the panel units increases the vertical "throw" of the individual grid racks (100) due to the differential in height between the saw toothed portion (111) of the raised sidewalls (108)(109) of the conventional grid racks (100) as compared to the increased height of the panel units (17) that are secured thereto, the presence of the intermediate saw toothed plates further increases the median height of the stalks or straw due to the face that the conventional arrangements have heretofore left the intermediate portions of the stems unsupported relative to the midsection of the individual steps of the grid racks (100).

While the original or alternate version of the preferred embodiment produced very satisfactory results, certain problems were associated with that version, such as the trapping of debris in gaps formed when the insert units (14)(15) and (16) were attached to the conventional grid rack structure (100). These gaps would trap stem segments and other debris that would eventually create blockages of the apertured steps requiring that the combine be stopped occasionally to clear the blockages. In addition, the installation of the original version turned out to be time consuming due to the fact that the saw toothed units (14)(15) and (16) had to be individually installed on each of the steps of the straw walker grid rack (100); and, a more efficient solution to these problems was sought.

As a consequence of the foregoing situation, the preferred embodiment of this invention was developed and this version offered significant advantages over the original version in that the first stage saw toothed unit (12) encompasses at least three of the first four steps of the grid rack (100) and further employs substantially less material to accomplish the same function. In addition, the forwardly directed saw tooth pattern formed on the lower end (23) of the plate elements (21), substantially reduces the likelihood that debris will become trapped between the lower end (23) of the plats (21) and their engagement with the initial steps of the grid rack (100). The same being true of the slots (29) and vertically oriented cross-piece elements (24) and their engagement with the leading edges or lips (117) of the respective steps.

It should also be noted that the rearwardly angled slot (33) on the second stage saw toothed units (13) not only facilitates the insertion of the plate elements (31) into the remaining steps (105) (106), etc. of the grid rack, but that and the configuration of the design of the plate elements (31) lends themselves to a fabrication process; wherein, the mounting flanges (35)(36) and (37) are formed integrally with the mounting plates (31) and their deformed into their respective perpendicular orientations relative to the main planar surface of the plates (31).

Having thereby described the subject matter of the present invention, it should be apparent that may substitutions, modifications and variations of the invention are possible in light of the above teachings. It is therefore to be understood that the invention as taught and described herein is only to be limited to the extent of the breadth and scope of the appended claims.

I claim:

1. An improvement to the straw walker portion of a grain combine wherein, the straw walker portion comprises a plurality of independently moveable grid racks and each grid rack has raised sides and a plurality of steps formed thereon, wherein the improvement comprises:

a plurality of saw toothed units operatively connected to said plurality of steps wherein the saw toothed units are disposed at a location spaced from the raised sides of each grid rack and include a first stage saw tooth unit, including a saw toothed member that is dimensioned to overlie at least a portion of the first four steps on the grid rack; wherein, the saw toothed member comprises a first pair of identical plate elements having an enlarged rearwardly angled saw tooth configuration on their upper end, and a generally stepped configuration on their lower end.

2. The improvement as in claim 1; wherein, selected ones of the first four steps of the grid rack are provided with apertured portions and the stepped lower end of the plate elements are provided with forwardly angled saw toothed portions which are dimensioned to be received in said apertured portions.

3. The improvement as in claim 1; wherein, each of the first four steps of the grid rack are provided with raised lips and the lower end of the plate elements are provided with discrete slots which are dimensioned to receive selected ones of the raised lips of said first four steps.

4. The improvement as in claim 3; wherein, the last of the first four steps of the grid rack is provided with a plurality of ribs, and the rearward lower end of the plate elements are provided with recesses dimensioned to receive said ribs.

5. The improvement as in claim 3; wherein, the plate elements are connected together by a plurality of cross-piece elements.

6. The improvement as in claim 5; wherein, the plurality of cross-piece elements are vertically oriented and disposed proximate to said discrete slots.

7. An improvement to the straw walker portion of a grain combine wherein, the straw walker portion comprises a plurality of independently moveable grid racks and each grid rack has raised sides and a plurality of steps formed thereon, wherein the improvement comprises:

a plurality of saw toothed units operatively connected to said plurality of steps wherein the saw toothed units are disposed at a location spaced from the raised sides of each grid rack; and, a saw toothed panel unit adapted to be secured to the raised sides of the grid rack wherein the upper end of the panel unit is provided with an enlarged saw toothed configuration that projects above the raised sides of the grid rack, and includes a pair of elongated panel members provided with an enlarged saw toothed configuration on their upper end and a generally flat configuration on their lower end; wherein, the angled panel members are dimensioned to extend over at least a portion of the first four steps of the grid rack.

8. The improvement as in claim 7; wherein, the elongated panel members are dimensioned to overlie a portion of at least two of the remaining steps of the grid rack.

9. An improvement to the straw walker portion of a grain combine wherein, the straw walker portion comprises a plurality of independently moveable grid racks and each grid rack has raised sides and a plurality of steps formed thereon, wherein the improvement comprises:

a plurality of saw toothed units operatively connected to said plurality of steps wherein the saw toothed units are disposed at a location spaced from the raised sides of each grid rack; and, a saw toothed panel unit adapted to be secured to the raised sides of the grid rack wherein the upper end of the panel unit is provided with an enlarged saw toothed configuration that projects above the raised sides of the grid rack, and includes a pair of angled panel members having an enlarged saw toothed configuration on their upper end, and a generally flat angled configuration on their lower end; and a pair of elongated panel members provided with an enlarged saw toothed configuration on their upper end and a generally flat configuration on their lower end wherein both pairs of panel members are dimensioned to overlie portions of sequential steps on said grid rack.

10. An improvement to the straw walker portion of a grain combine wherein the straw walker portion comprises a plurality of independently moveable grid racks and each grid rack has raised sides and a plurality of steps formed thereon wherein the improvement comprises a plurality of saw toothed units connected to said plurality of steps wherein the saw toothed units are disposed at a location spaced from the raised sides of each grid rack and include a saw toothed member that is dimensioned to overlie adjacent steps on the grid rack; wherein, the saw toothed member comprises a first pair of identical plate elements disposed parallel to one another and directly connected to said adjacent steps on the grid rack and each plate element has a rearwardly angled saw tooth configuration on the upper end thereof.

11. The improvement as in claim 10; wherein said first pair of identical plate elements are connected to each other.

12. The improvement as in claim 10; further comprising a saw toothed panel unit adapted to be secured to the raised sides of the grid rack and including a pair of elongated panel members disposed parallel to one another and provided with an enlarged saw toothed configuration on their upper ends wherein each panel member spans the length of said adjacent steps on the grid rack.

13. An improvement to the straw walker portion of a grain combine wherein, the straw walker portion comprises a plurality of independently moveable grid racks and each grid rack had raised sides and a plurality of steps formed thereon, wherein the improvement comprises:

a first pair of plate elements disposed parallel to one another and spaced from the raised sides of each grid rack; wherein, each plate element is dimensioned to overlie and be connected to adjacent steps on the grid rack and is provided with a rearwardly angled saw tooth configuration on the upper end thereof; and, a first pair of elongated panel members secured to the raised sides of the grid rack;

wherein, the panel members are provided with an enlarged saw toothed configuration on their upper ends and are dimensioned to span the lenghth of said adjacent steps on the grid rack.

* * * * *